US008661720B2

(12) United States Patent
Miller (10) Patent No.: US 8,661,720 B2
(45) Date of Patent: Mar. 4, 2014

(54) MAGNETIC LICENSE PROTECTION AND TAGGING SYSTEM

(76) Inventor: Matthew Steven Miller, Mount Vernon, OH (US)

(*) Notice: Subject to any disclaimer, the term of this patent is extended or adjusted under 35 U.S.C. 154(b) by 2 days.

(21) Appl. No.: 13/416,550

(22) Filed: Mar. 9, 2012

(65) Prior Publication Data

US 2012/0227295 A1 Sep. 13, 2012

Related U.S. Application Data

(60) Provisional application No. 61/451,660, filed on Mar. 11, 2011.

(51) Int. Cl.
*A01K 11/00* (2006.01)

(52) U.S. Cl.
CPC ..................... *A01K 11/00* (2013.01)
USPC .............................. 40/300; 40/304

(58) Field of Classification Search
USPC ............... 40/300–304; 150/147, 149, 146
See application file for complete search history.

(56) References Cited

U.S. PATENT DOCUMENTS

| 3,144,894 | A * | 8/1964 | Young ........................ 150/134 |
| 3,586,085 | A * | 6/1971 | Torongo, Jr. ................. 150/143 |
| 5,170,889 | A * | 12/1992 | Cue ............................ 206/232 |
| 6,644,694 | B2 * | 11/2003 | Seawright .................... 283/34 |
| 6,735,894 | B2 * | 5/2004 | Crusenberry et al. ..... 40/654.01 |
| 2004/0250933 | A1 * | 12/2004 | DeMichele .................. 150/145 |
| 2006/0201595 | A1 * | 9/2006 | Carmichael .................. 150/143 |
| 2009/0090753 | A1 * | 4/2009 | Irvin ........................... 224/218 |
| 2010/0229435 | A1 * | 9/2010 | Diliscia et al. .............. 40/300 |

* cited by examiner

*Primary Examiner* — Joanne Silbermann
*Assistant Examiner* — Christopher E Veraa
(74) *Attorney, Agent, or Firm* — Fraser Clemens Martin & Miller LLC; Jacob M. Ward (57) ABSTRACT

A magnetic license protection and tagging device includes a main body with at least one magnet. The main body has a first pocket for holding at least one of a license and a tag. The main body is foldable between an open position and a closed position. The at least one magnet is connected to the main body, and selectively militates against the main body moving from the closed position to the open position. The magnetic license protection and tagging device may be secured to a game animal by magnetic attraction. The magnetic license protection and tagging device is used to appropriately tag the game animal in compliance with hunting laws.

15 Claims, 6 Drawing Sheets

FIG. 8

MAGNETIC LICENSE PROTECTION AND TAGGING SYSTEM

CROSS-REFERENCE TO RELATED APPLICATIONS

This application claims the benefit of U.S. Provisional Patent Application No. 61/451,660, filed on Mar. 11, 2011. The entire disclosure of the above application is hereby incorporated herein by reference.

FIELD OF THE INVENTION

The present disclosure relates to a hunting system and, in particular, to a hunting license protection and tagging system.

BACKGROUND OF THE INVENTION

A hunting license is issued by a government authority such as a department of natural resources for various purposes including protecting and controlling the game animal population, providing a source of revenue, and ensuring that hunters are qualified to use weapons in a safe manner. The hunting license may be printed on a form that the hunter carries as evidence that the hunter is authorized to be hunting.

The government authority may also require that every hunter who kills a game animal, such as a deer or a turkey, must immediately fill out a temporary tag with the name and address of the hunter, and the date and time the game was killed. The temporary tag may be detached from a permit issued by the government authority in additional to the hunting license. The temporary tag must be immediately attached to the harvested game animal at the place where the game animal fell, before the game animal may be moved for subsequent processing. The temporary tag must remain on the game animal until the game animal is permanently tagged.

Typically, the temporary tag is tied to the game animal with string, wire, etc. The temporary tag may also be placed in reusable protective holder, either fashioned by the hunter or purchased from a dealer, which protects the temporary tag from degradation by exposure to the elements. However, the hunter must remember to bring string and wire to hold the temporary tag to the harvested game animal, as well as a writing instrument with which to record the legally required information about the kill. Known protective holders are also not easily attached to the harvested game animal.

There is a continuing need for a license protection and tagging system that permits a hunter to easily carry a hunting license and affix a temporary tag to a harvested game animal. Desirably, the license protection and tagging system protects the hunting license and the temporary tag from the elements.

SUMMARY OF THE INVENTION

In concordance with the instant disclosure, a license protection and tagging system that permits a hunter to easily carry a hunting license and affix a temporary tag to a harvested game animal, and which protects the hunting license and the temporary tag from the elements, is surprisingly discovered.

In one embodiment, a magnetic license protection and tagging device includes a main body and at least one magnet. The main body has a first pocket for holding at least one of a license and a tag. The main body is foldable between an open position and a closed position. The at least one magnet is connected to the main body. The at least one magnet selectively militates against the main body moving from the closed position to the open position.

In another embodiment, a magnetic license protection and tagging system includes the magnetic license protection and tagging device and an article of apparel. The magnetic license protection and tagging device removably clamps to the article of apparel when the main body is moved to the closed position by magnetic attraction.

In a further embodiment, a method for tagging a game animal includes the provision of the magnetic license protection and tagging device with the at least one of the license and the tag, and the game animal. The magnetic license protection and tagging device is folded around a portion of the game animal. The magnetic license protection and tagging device is secured to the game animal by magnetic attraction. The game animal is thereby appropriately tagged for transportation.

In an exemplary embodiment, a magnetic license protection and tagging system includes a holder. The holder will be used for protecting hunting and fishing licenses, as well as being used for tagging harvested game. The holder is made from two rectangular cloth pieces that are sewn together, and are then folded to form two pockets on either side. These pockets can be used to store things such as keys, hand warmers and money. On one side of the holder is a plastic protective casing measuring 3¼" by 4¼". The casing has a lip at the top that closes to protect paper documents. Located at the bottom of the holder, when it is folded, is a cloth pocket that holds a pencil. This product utilizes eight strong, square neodymium magnets that are sewn into the top corners and approximately three inches down on each side of the holder. Each magnet has approximately seven pounds of pull strength. When the holder closes, the magnets snap together to resemble a square camouflage and orange wallet. The strong magnets are also used to attach the license holder to the back and sides of regular hats and toboggans. When the time for tagging comes, the user utilizes the strong magnets of the holder to fasten the holder around antlers and legs for protected game transportation. One side of the invention has orange fabric, while the other has camouflage so that it can blend in with different forms of hunting attire. Since carrying wallets or purses can be cumbersome for other outdoor enthusiasts such as bikers and joggers, the holder may also be provided in different colors, shapes and sizes, and will affix to hats and other clothing.

DRAWINGS

The above, as well as other advantages of the present disclosure, will become readily apparent to those skilled in the art from the following detailed description, particularly when considered in the light of the drawings described herein.

DETAILED DESCRIPTION OF THE INVENTION

The following detailed description and appended drawings describe and illustrate various embodiments of the invention. The description and drawings serve to enable one skilled in the art to make and use the invention, and are not intended to limit the scope of the invention in any manner. In respect of the methods disclosed, the order of the steps presented is exemplary in nature, and thus, is not necessary or critical.

As shown in FIGS. 1-8, a magnetic license protection and tagging device 100 includes a main body 102. The main body 102 is foldable about at least one of a first axis A and a second axis B between an open position (shown in FIG. 1) and a closed position (shown in FIG. 2). The first axis A may be substantially parallel with the second axis B. For example, the main body 102 may be substantially rectangular when opened, and may be substantially square when closed by folding about the first axis A. It should be appreciated that the main body 102 of the magnetic license protection and tagging device 100 may have any other shape when opened or closed such as oval, circular, half-circular, irregular, and the like, as desired.

The main body 102 having a first pocket 104 for holding at least one of a license and a tag 106. The first pocket 104 is transparent and permits a reading of the at least one of the license and the tag 106 without removing the at least one of the license and the tag 106 from the first pocket 104. The first pocket 104 may be formed from a plastic envelope affixed to the main body 102. The plastic envelope may be affixed with one of stitching and an adhesive, as nonlimiting examples. The plastic envelope may also have a foldable top, which may be used to fully enclose the at least one of the license and the tag 106. The plastic envelope may protect the at least one of the license and the tag 106 from the elements, and militate against a degradation of the at least one of the license and the tag 106.

The magnetic license protection and tagging device 100 may include a first panel 126 and a second panel 128, for example. The first pocket 104 may be disposed on the first panel 126. The first panel 126 and the second panel 128 may be separated by a hinge 130 disposed therebetween. The hinge 130 connects the first panel 126 and the second panel 128.

Figure 1:
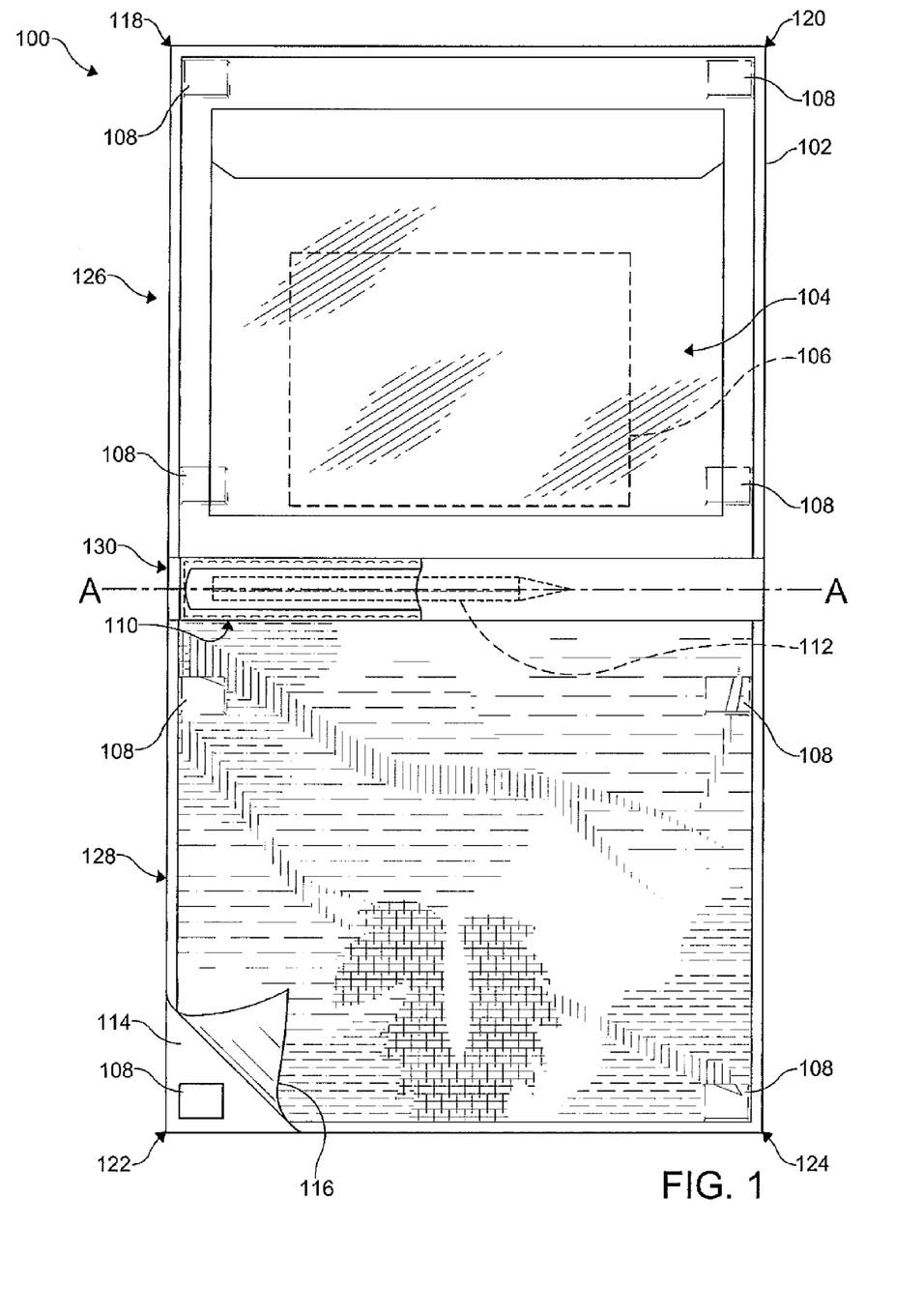
FIG. 1 is a front elevational view of the magnetic license protection and tagging device according to one embodiment of the present disclosure, showing the device in an open position.
Figure 3:
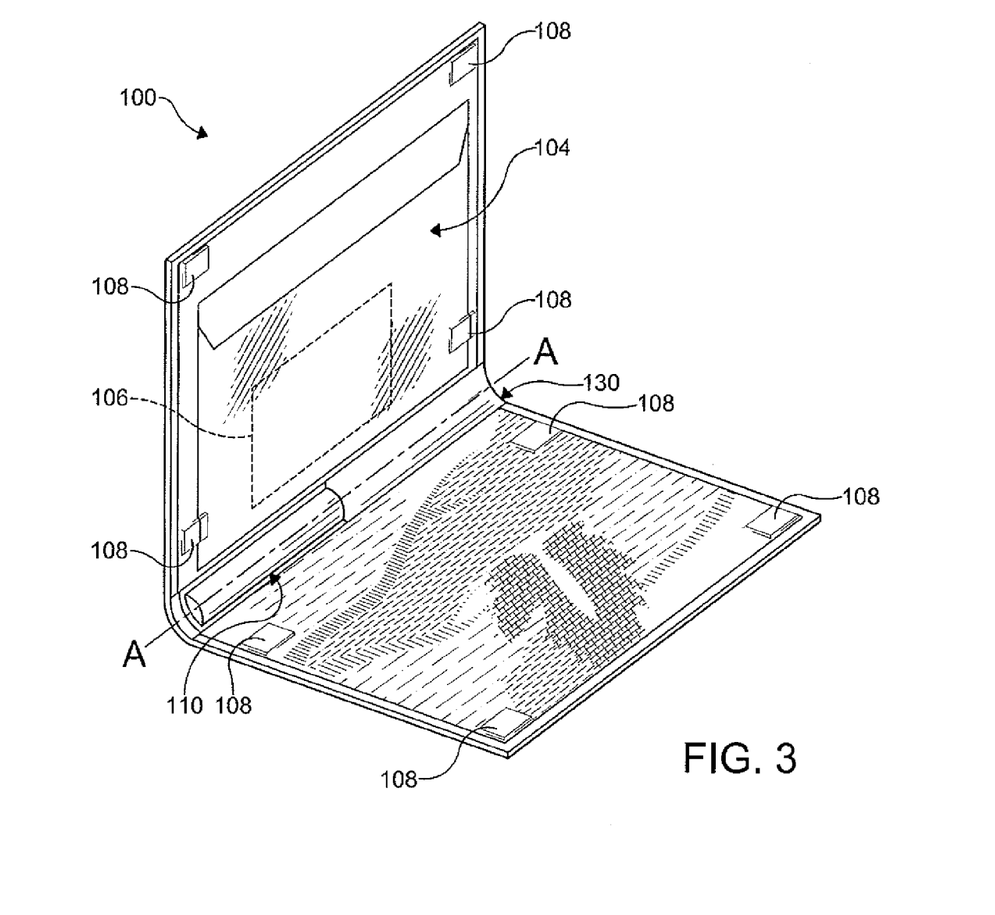
FIG. 3 is a side perspective view of the magnetic license protection and tagging device illustrated in FIGS. 1-2, showing the device in a partly open position.

The magnetic license protection and tagging device 100 may also include a second pocket 110. As shown in FIGS. 1 and 3, the second pocket 110 may be formed on the hinge 130 disposed between the first panel 126 and the second panel 128. The second pocket 110 may be formed by a layer of material stitched between the first panel 126 and the second panel 128, for example. The second pocket 110 is advantageously adapted for holding a writing device 112, such as a pen or a pencil.

Figure 2:
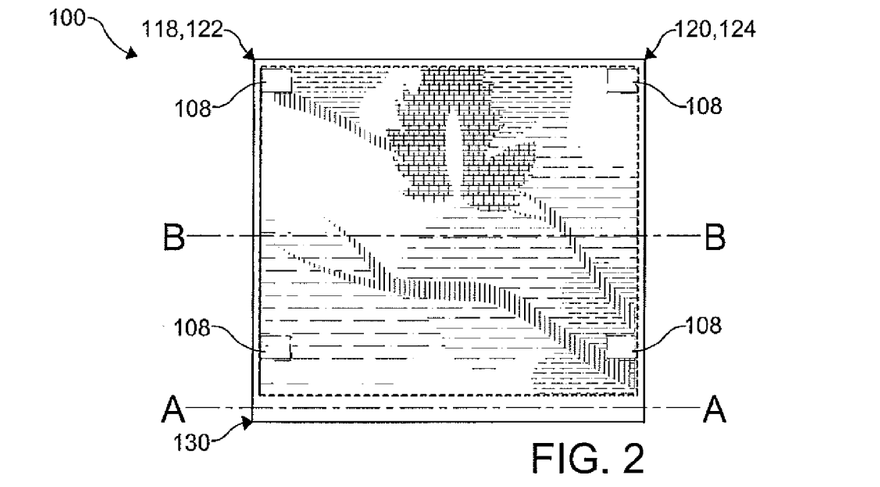
FIG. 2 is a rear elevational view of the magnetic license protection and tagging device illustrated in FIG. 1, showing the device in a closed position.

As shown in FIGS. 1-3, the magnetic license protection and tagging device 100 may include at least one magnet 108 connected to the main body 102. The at least one magnet 108 selectively militates against the main body 102 moving from the closed position to the open position. In particular embodiments, the at least one magnet 108 is a rare-earth magnet such as a neodymium magnet. Other types of magnets 108 may also be used within the scope of the present disclosure.

In one example, the at least one magnet 108 may be attracted to a ferrous or iron containing body also connected to the main body 102, to selectively hold the main body 102 in the closed position. In another example, the at least one magnet 108 is attracted to another magnet 108 also connected to the main body 102, to selectively hold the main body 102 in the closed position.

In particularly illustrative embodiments, the at least one magnet 108 includes a plurality of magnets 108. As shown in FIGS. 1-3, one of the plurality of magnets 108 may be disposed at each corner of 118, 120, 122, 124 of the main body 102. A pair of the plurality of magnets 108 may also be disposed adjacent to, and on opposing sides of, the hinge 130. The configuration of the plurality of magnets 108 at each of the corners 118, 120, 122, 124 and on opposing sides of the hinge 130, as shown in FIGS. 1-3, advantageously permits the folding of the main body 102 about both the first axis A and the second axis B, and the holding of the main body 102 in the closed position through magnetic attraction of the magnets 108.

In certain embodiments, the at least one magnet 108 is disposed between a front cover 114 and a rear cover 116 of the main body 102. The front cover 114 may be provided in a camouflage pattern, and the rear cover 116 may be provided in a hunter orange color, as nonlimiting examples. Other colors for the front cover 114 and the rear color 116 may also be used within the scope of the disclosure.

The front cover 114 may be affixed to the rear cover 116 with one of stitching and an adhesive, as nonlimiting examples. The at least one magnet 108 may be stitched in place between the front cover and the rear cover of the main body. Alternatively, the at least one magnet may be held in place with an adhesive between the front cover 114 and the rear cover 116. Other means for holding the at least one magnet between the front cover 114 and the rear cover 116 may also be used, as desired.

Figure 4:
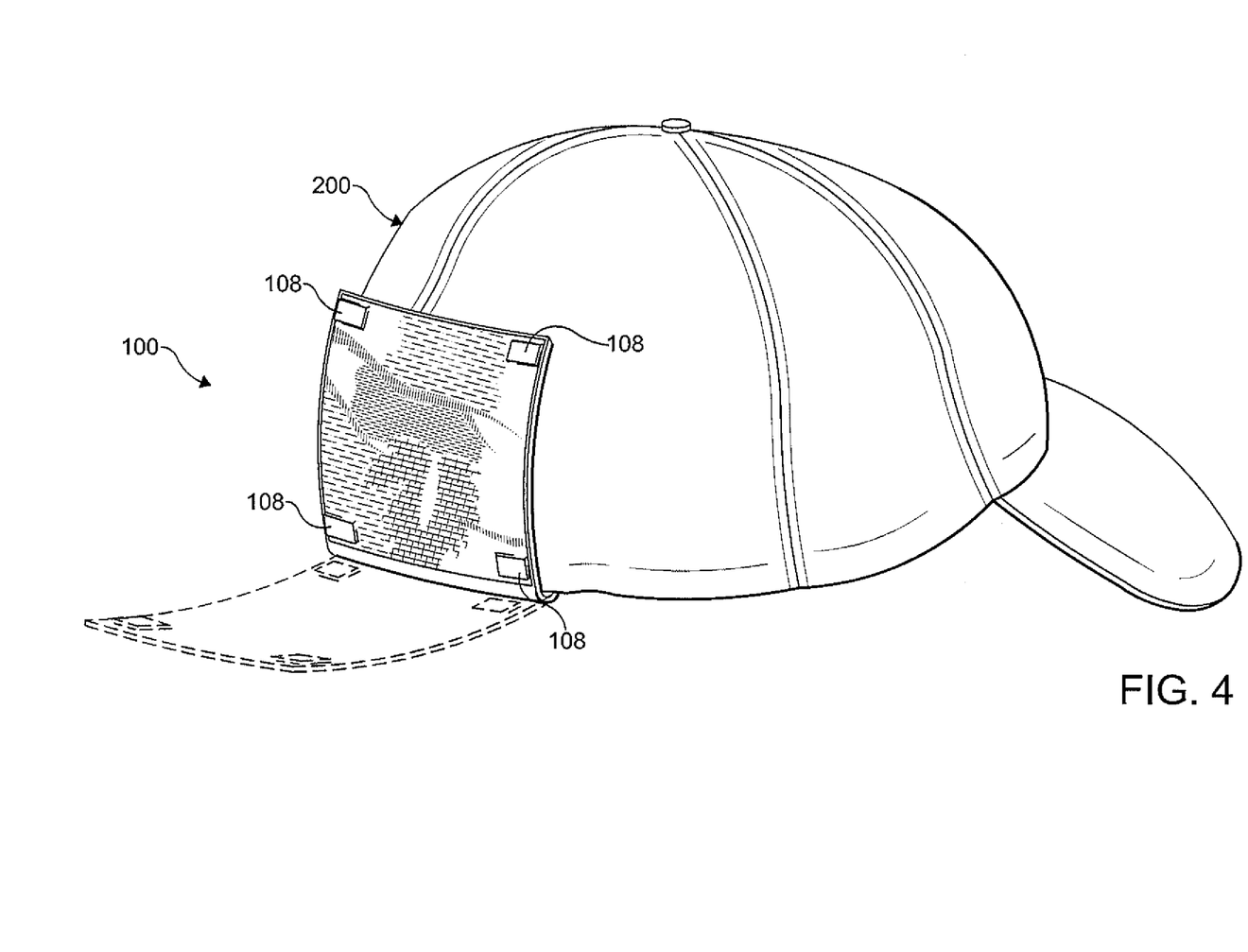
FIG. 4 is a side perspective view of the magnetic license protection and tagging device illustrated in FIGS. 1-3, showing the device cooperating with a hat through magnetic attraction and dashed lines indicating an open position where the device may be removed from the hat.
Figure 5:
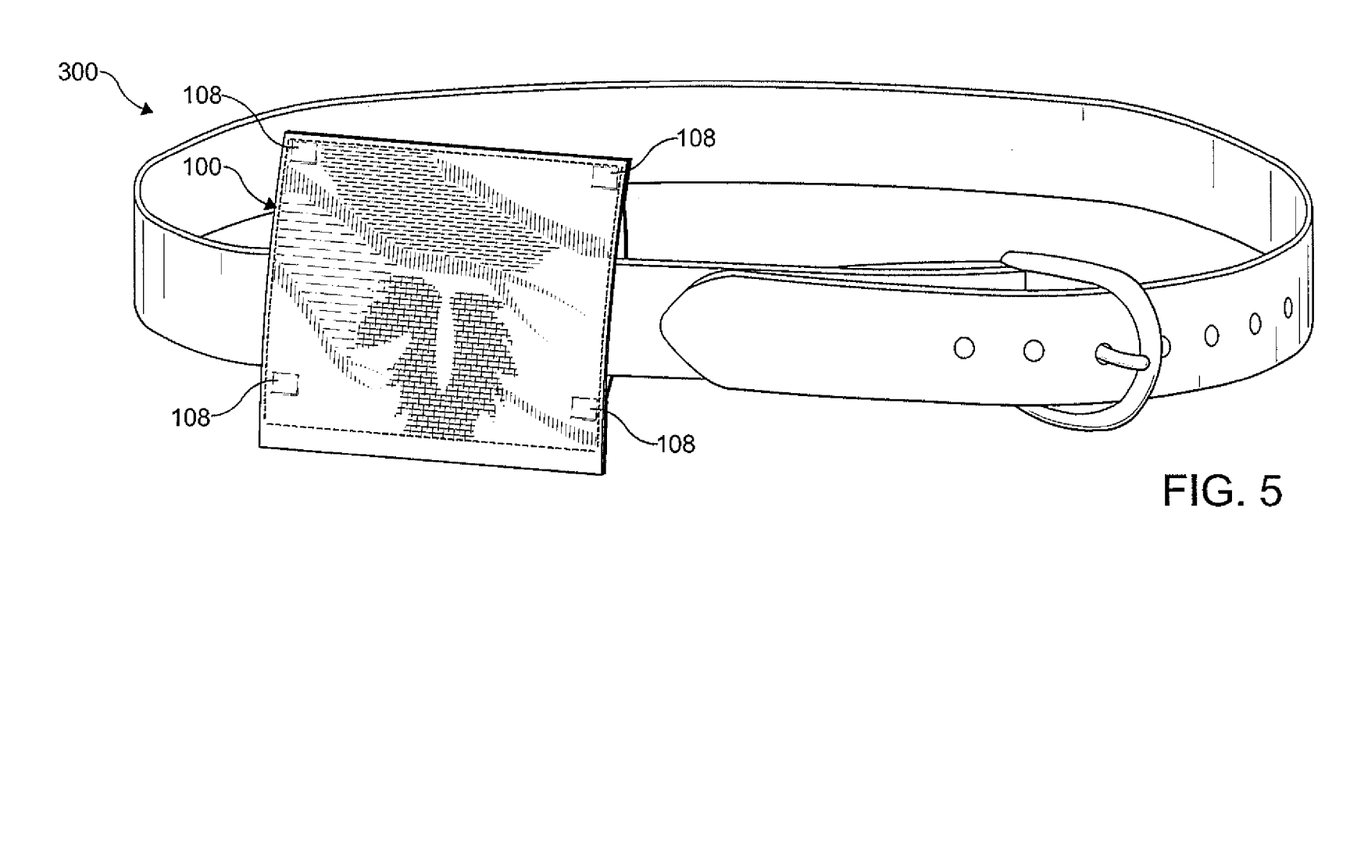
FIG. 5 is a side perspective view of the magnetic license and protection device illustrated in FIGS. 1-4, showing the device cooperating with a belt.

Referring now to FIGS. 4-5, the present disclosure also includes a magnetic license protection and tagging system. In particular embodiments, the system includes the magnetic license protection and tagging device 100 and an article of apparel 200, 300. As shown in FIG. 4, the article of apparel 200 may be a hat such as a baseball cap or a toboggan. As shown in FIG. 5, the article of apparel 300 may be a belt. In a further example, not illustrated, the article of apparel 200, 300 may be a back pack. The magnetic license protection and tagging device 100 is removably clamped to the article of apparel 200, 300 when the main body 102 is moved to the closed position by magnetic attraction. The clamping of the magnetic license protection and tagging device 100 with the article of apparel 200, 300 advantageously permits the at least one of the license and tag 106 to be carried by the user when hunting or fishing. Other types of articles of apparel 200, 300 may also be used with the magnetic license protection and tagging device 100, as desired.

Figure 6:
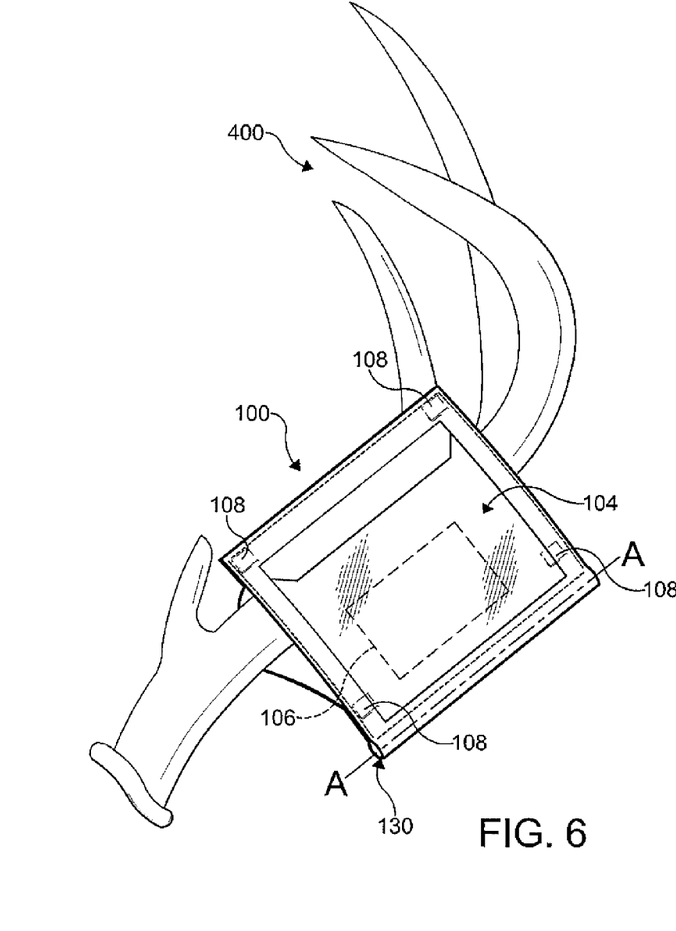
FIG. 6 is a side perspective view of the magnetic license and protection device illustrated in FIGS. 1-5, showing the device being folded once and cooperating with an antler of a deer for the purpose of tagging the deer.
Figure 7:
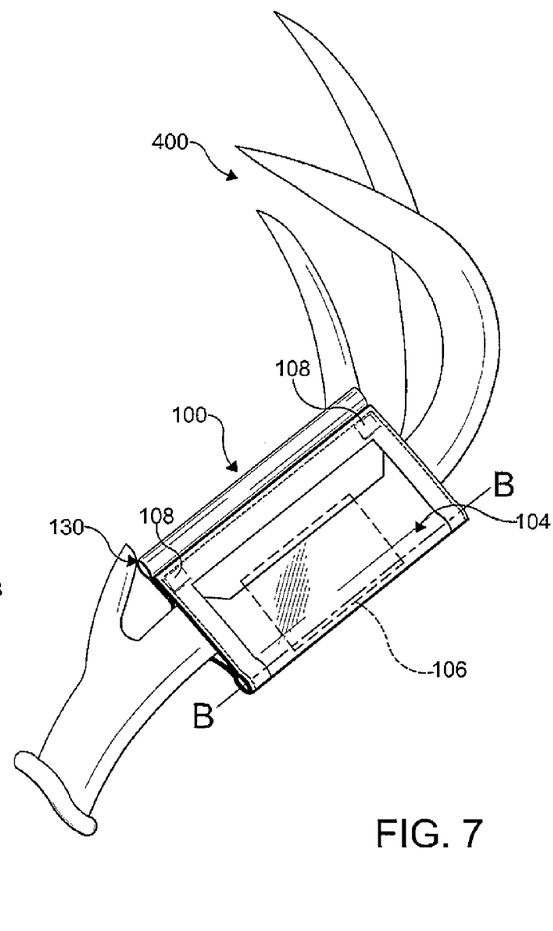
FIG. 7 is a side perspective view of the magnetic license and protection device illustrated in FIGS. 1-6, showing the device being folded twice and cooperating with an antler of a deer for the purpose of tagging the deer.
Figure 8:
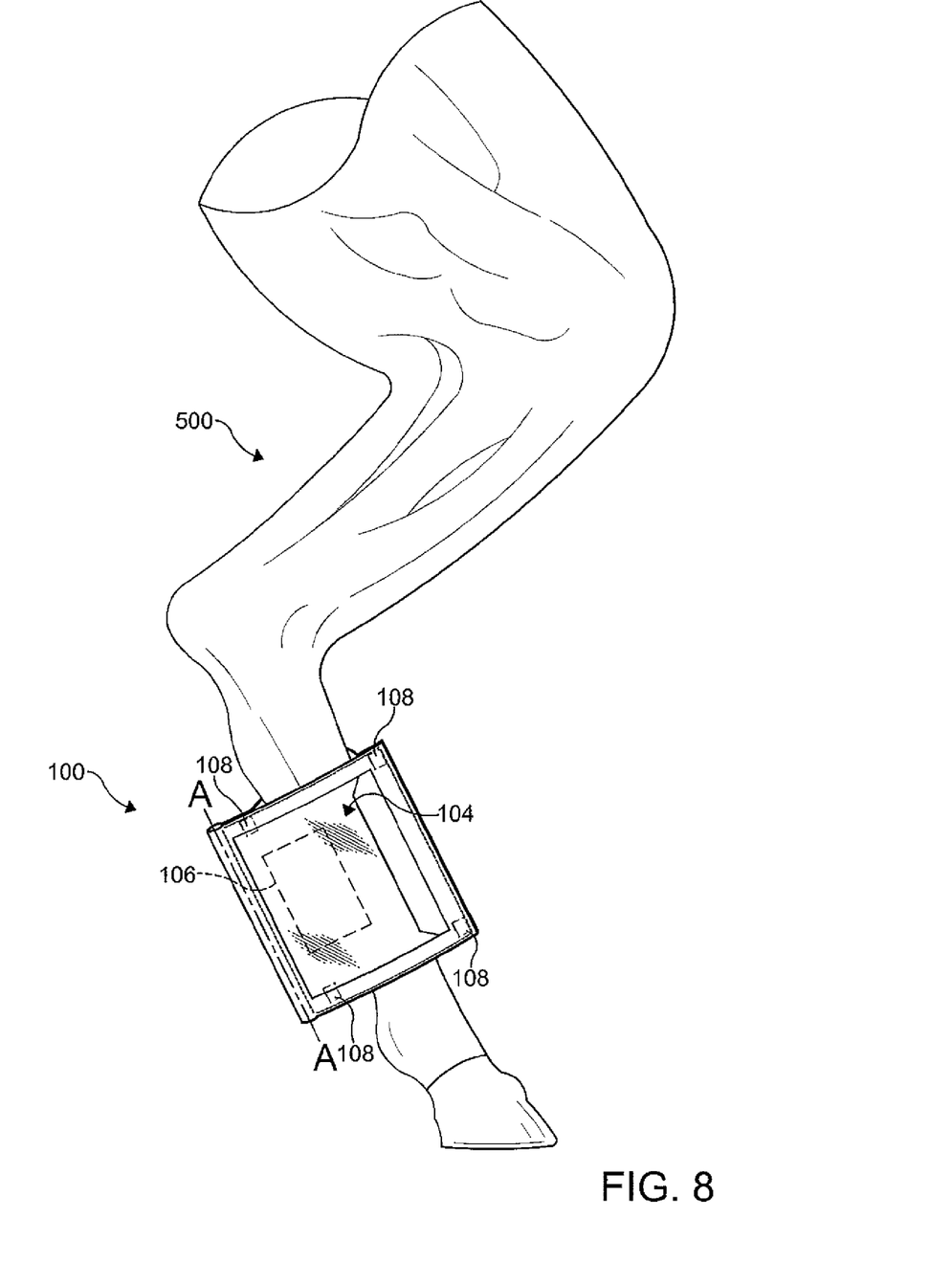
FIG. 8 is a side perspective view of the magnetic license and protection device illustrated in FIGS. 1-7, showing the device being folded once and cooperating with a leg of a deer for the purpose of tagging the deer.

The present disclosure further includes a method for tagging a game animal with the magnetic license protection and tagging device 100, for example, as shown in FIGS. 6-8. The method includes a provision of the magnetic license protection and tagging device 100 and the game animal. The magnetic license protection and tagging device 100 having the at least one of the license and tag is folded around a portion 400, 500 of the game animal. The magnetic license protection and tagging device 100 is thereby secured to the game animal by magnetic attraction, and the game animal is appropriately tagged for transportation.

As shown in FIGS. 6 and 7, the portion 400 of the game animal around which the magnetic license protection and tagging device 100 is folded includes an antler. The magnetic license protection and tagging device 100 may be folded once, for example, about the first axis A, as shown in FIG. 6. If it is desired to more tightly secure the magnetic license protection and tagging device 100 to the portion 400 of the game animal, the magnetic license protection and tagging device 100 may be folded twice, for example, about the first axis A and then the second axis B, as shown in FIG. 7. The magnetic license protection and tagging device 100 may be folded additional times within the scope of the disclosure.

In a further embodiment shown in FIG. 8, the portion 400 of the game animal around which the magnetic license protection and tagging device 100 is folded includes a leg. Although the leg shown is the leg of a deer, it should be appreciated that the magnetic license protection and tagging device 100 may be used with the legs of other game animals, as desired. Like the folding of the magnetic license protection and tagging device 100 around the antler, the magnetic license protection and tagging device 100 may be folded once, as shown in FIG. 8, or may be folded twice to be more tightly secured to the leg, as desired.

Advantageously, the license protection and tagging device 100 permits the hunter to easily carry the hunting license and affix the temporary tag to the harvested game animal. The license protection and tagging device 100 also protects the hunting license and the temporary tag from the elements.

While certain representative embodiments and details have been shown for purposes of illustrating the invention, it will be apparent to those skilled in the art that various changes may be made without departing from the scope of the disclosure, which is further described in the following appended claims.

What is claimed is:

1. A magnetic license protection and tagging device, comprising:
    a main body having a first panel and a second panel, the first panel and the second panel connected by a hinge disposed between the first panel and the second panel, the first panel having a first pocket for holding at least one of a license and a tag, the hinge having a second pocket for holding a writing device, the second pocket disposed between the first panel and the second panel, wherein the main body is foldable along a first axis between an open position and a closed position and also foldable along a second axis between the closed position and a twice folded position, the first axis oriented along the hinge between the first panel and the second panel, the first axis bisecting the main body in the open position into two portions having substantially a same size, the second axis oriented substantially parallel with and spaced apart from the first axis, the second axis bisecting the main body in the closed position into two portions having substantially a same size, and wherein the first panel and the second panel are foldable together along the second axis to the twice folded position after the main body has been folded along the first axis; and
    at least one magnet connected to the main body, the at least one magnet selectively militating against the main body moving to the open position when the main body is folded in the closed position, and the at least one magnet selectively militating against the main body moving to the closed position when the main body is folded in the twice folded position.

2. The device of claim 1, wherein the first pocket is transparent and permits a reading of the at least one of the license and the tag without removing the at least one of the license and the tag from the first pocket.

3. The device of claim 1, wherein the at least one magnet includes a plurality of magnets.

4. The device of claim 3, wherein one of the plurality of magnets is disposed at each corner of the main body.

5. The device of claim 4, wherein a pair of the plurality of magnets are disposed adjacent to and on opposing sides of the hinge.

6. The device of claim 1, wherein the at least one magnet is disposed between a front cover and a rear cover of the main body.

7. The device of claim 6, wherein the at least one magnet is stitched in place between the front cover and the rear cover of the main body.

8. A magnetic license protection and tagging system, comprising:
    a magnetic license protection and tagging device, including a main body having a first panel and a second panel, the first panel and the second panel connected by a hinge disposed between the first panel and the second panel, the first panel having a first pocket for holding at least one of a license and a tag, the hinge having a second pocket for holding a writing device, the second pocket disposed between the first panel and the second panel, wherein the main body is foldable along a first axis between an open position and a closed position and also foldable along a second axis between the closed position and a twice folded position, the first axis oriented along the hinge between the first panel and the second panel, the first axis bisecting the main body in the open position into two portions having substantially a same size, the second axis oriented substantially parallel with and spaced apart from the first axis, the second axis bisecting the main body in the closed position into two portions having substantially a same size, and wherein the first panel and the second panel are foldable together along the second axis to the twice folded position after the main body has been folded along the first axis, and at least one magnet connected to the main body, the at least one magnet selectively militating against the main body moving to the open position when the main body is folded in the closed position, and the at least one magnet selectively militating against the main body moving to the closed position when the main body is folded in the twice folded position; and
    an article of apparel to which the magnetic license protection and tagging device removably clamps when the main body is moved to the closed position by magnetic attraction.

9. The system of claim 8, wherein the article of apparel is a hat.

10. The system of claim 8, wherein the article of apparel is a belt.

11. A method for tagging a game animal, the method comprising the steps of:
    providing a magnetic license protection and tagging device, including a main body having a first panel and a second panel, the first panel and the second panel connected by a hinge disposed between the first panel and the second panel, the first panel having a first pocket for holding at least one of a license and a tag, the hinge having a second pocket for holding a writing device, the second pocket disposed between the first panel and the second panel, wherein the main body is foldable along a first axis between an open position and a closed position and also foldable along a second axis between the closed position and a twice folded position, the first axis oriented along the hinge between the first panel and the second panel, the first axis bisecting the main body in the open position into two portions having substantially a same size, the second axis oriented substantially parallel with and spaced apart from the first axis, the second axis bisecting the main body in the closed position into two portions having substantially a same size, and wherein the first panel and the second panel are foldable together along the second axis to the twice folded position after the main body has been folded along the first axis, and at least one magnet connected to the main body, the at least one magnet selectively militating against the main body moving to the open position when the main body is folded in the closed position, and the at least one magnet selectively militating against the main body moving to the closed position when the main body is folded in the twice folded position;

providing the game animal; and folding the magnetic license protection and tagging device with the at least one of the license and the tag around a portion of the game animal, the magnetic license protection and tagging device secured to the game animal by magnetic attraction, wherein the game animal is appropriately tagged for transportation.

12. The method of claim 11, wherein the magnetic license protection and tagging device is carried on a hat prior to tagging the game animal.

13. The method of claim 11, wherein the portion of the game animal includes one of an antler and a leg of the game animal.

14. The method of claim 11, wherein the magnetic license protection and tagging device is folded about the first axis.

15. The method of claim 14, wherein the magnetic license protection and tagging device is also folded about the second axis.

* * * * *